US008107697B2

(12) United States Patent
Khazen et al.

(10) Patent No.: US 8,107,697 B2
(45) Date of Patent: Jan. 31, 2012

(54) TIME-SEQUENTIAL VOLUME RENDERING

(75) Inventors: Michael Khazen, Sutton (GB); Martin Osmund Leach, Ashurst Wood (GB)

(73) Assignees: The Institute of Cancer Research: Royal Cancer Hospital, London (GB); The Royal Marsden NHS Foundation Trust, Surrey (GB)

( * ) Notice: Subject to any disclaimer, the term of this patent is extended or adjusted under 35 U.S.C. 154(b) by 811 days.

(21) Appl. No.: 12/092,589

(22) PCT Filed: Sep. 14, 2006

(86) PCT No.: PCT/GB2006/003405
§ 371 (c)(1),
(2), (4) Date: Sep. 11, 2008

(87) PCT Pub. No.: WO2007/054662
PCT Pub. Date: May 18, 2007

(65) Prior Publication Data
US 2009/0046914 A1 Feb. 19, 2009

(30) Foreign Application Priority Data

Nov. 11, 2005 (GB) .................................. 0523084.2

(51) Int. Cl.
*G06K 9/00* (2006.01)

(52) U.S. Cl. ........................................ 382/128; 382/154

(58) Field of Classification Search .......... 382/128–132, 382/154
See application file for complete search history.

(56) References Cited

U.S. PATENT DOCUMENTS

| 4,991,224 A | * | 2/1991 | Takahashi et al. ............ 382/180 |
| 5,056,146 A | * | 10/1991 | Nishide ......................... 382/131 |
| 5,297,550 A | * | 3/1994 | Margosian .................... 600/419 |

(Continued)

FOREIGN PATENT DOCUMENTS

EP 1420367 5/2004

(Continued)

OTHER PUBLICATIONS

Knopp, M.V., et al., "Minireview: Functional Magnetic Resonance Imaging in Oncology for Diagnosis and Therapy Monitoring", Molecular Cancer Therapeutics [Online], vol. 2, Apr. 2003, pp. 419-426. http://mct.aacrjournals.org/cgi/reprint/2/4/419?ck=nck.

(Continued)

*Primary Examiner* — Manav Seth
(74) *Attorney, Agent, or Firm* — Niels Haun; Dann, Dorfman, Herrell & Skillman, P.C.

(57) ABSTRACT

There is disclosed a method and apparatus for generating data for a two-dimensional image which identifies different classes of property of an imaged subject, this being done by separately rendering volumetric data classified into those different classes and, from all of those separate renderings, choosing one datum for use in the two-dimensional image as an image pixel. This being repeatable for each datum to be used in the two-dimensional image—thereby, for example, to selectively build-up the data for whole of the two-dimensional image as a mixture/combination of different classes of data. The data for the two-dimensional image may be color coded for visually distinguishing data of different classes. Thus when applied to the image enhancement of tissues subjected to contrast agent uptake in patients kinetic information may be incorporated into the volume renderings to enable tissues of different enhancement and kinetic characteristics to be identified as such.

48 Claims, 4 Drawing Sheets

U.S. PATENT DOCUMENTS

| | | | |
|---|---|---|---|
| 5,297,551 A * | 3/1994 | Margosian et al. | 600/410 |
| 5,368,033 A * | 11/1994 | Moshfeghi | 600/419 |
| 5,526,816 A | 6/1996 | Arditi | |
| 5,732,701 A * | 3/1998 | Yoshitome et al. | 600/410 |
| 5,781,194 A * | 7/1998 | Ponomarev et al. | 345/424 |
| 5,793,375 A * | 8/1998 | Tanaka | 345/426 |
| 5,891,030 A * | 4/1999 | Johnson et al. | 600/407 |
| 6,381,486 B1 * | 4/2002 | Mistretta et al. | 600/420 |
| 6,519,354 B1 * | 2/2003 | Oshio | 382/130 |
| 6,549,798 B2 * | 4/2003 | Stefancik et al. | 600/419 |
| 6,552,723 B1 * | 4/2003 | Duluk et al. | 345/419 |
| 6,674,894 B1 * | 1/2004 | Parker et al. | 382/154 |
| 6,718,055 B1 | 4/2004 | Suri | |
| 6,928,314 B1 * | 8/2005 | Johnson et al. | 600/407 |
| 6,947,584 B1 * | 9/2005 | Avila et al. | 382/131 |
| 6,967,653 B2 * | 11/2005 | Wittenbrink et al. | 345/440 |
| 7,085,406 B2 * | 8/2006 | Alyassin | 382/131 |
| 7,120,290 B2 * | 10/2006 | Parker et al. | 382/154 |
| 7,218,108 B2 * | 5/2007 | Ichinose et al. | 324/309 |
| 2003/0151604 A1 * | 8/2003 | Kaufman et al. | 345/419 |
| 2004/0064037 A1 | 4/2004 | Smith | |
| 2005/0113680 A1 | 5/2005 | Ikeda et al. | |
| 2005/0143654 A1 | 6/2005 | Zuiderveld et al. | |

FOREIGN PATENT DOCUMENTS

| | | |
|---|---|---|
| WO | 93/05405 | 3/1993 |

OTHER PUBLICATIONS

Twellmann, T., et al., "An Adaptive Extended Colour Scale for Comparison of Pseudo Colouring Techniques for, DCE-MRI Data", Workshop Fur Bildverarbeitung Fur Die Medizin 2005 [online], Mar. 2005, www.techfak.uni-bielefeld.de/ags/ni/publications/media/TwellmannLichteSaalbachWismuellerNattkemper2005-ACC.ps.gz.

Rueckert, D., et al., "Nonrigid Registration Using Fee-Form Deformations: Application to Breast MR Images", IEEE Transactions on Medical Imaging, IEEE Service Center, Piscataway, NJ, US, vol. 18, No. 8, Aug. 1999.

Degani, H., et al, "Mapping Pathophysiological Features of Breast Tumors by MRI at High Spatial Resoluton" Nature Medicine, vol. 3, No. 7, Jul. 1997, pp. 780-782.

Khazen, M, et al., "Magnetic Resonance Breast Imaging Analysis and Review (MRBVIEW)—Specialized Image Procesing Workstation for Dynamic Contrast Enhanced (DCE) MRI of the Breast", Nov. 30, 2004, http://rsna2004.rsna.org/rsna2004/V2004/conference/event_display.cfm?em_id=4405593....

International Search Report dated Nov. 17, 2006 from PCT/GB2006/003405, 5 pages.

Written Opinion of the International Searching Authority from PCT/GB2006/003405, 10 pages.

U.K. Search Report dated May 24, 2006 from 0523084.2, 1 page.

* cited by examiner

TIME-SEQUENTIAL VOLUME RENDERING

PRIORITY APPLICATIONS

This application is a 371 application of International Application No. PCT/GB2006/003405 filed Sep. 14, 2006, which claims priority to United Kingdom Patent Application No. 0523084.2 filed Nov. 11, 2005. Each of the foregoing applications is hereby incorporated herein by reference.

The present invention relates to methods and apparatus for imaging, and particularly, though not exclusively, to methods and apparatus for generating data for use in constructing a two-dimensional image rendered from volumetric data representing a subject in three spatial dimensions.

The imaging of the internal regions of a subject (e.g., a human subject) typically involves the acquisition of volumetric data. Volumetric data so acquired may be considered to include data items defined according to a three-dimensional reference frame within which the imaged subject resided during imaging, each data item conveying information about the three-dimensional point or region with which it is associated. Each such volumetric data item typically has associated with it at least a three-dimensional coordinate (e.g., x, y, z) defined in accordance with the reference frame in question, and may have an additional $4^{th}$ coordinate representing a temporal dimension. The volumetric data may be represented as a stack (ordered set) of volume slices. Each slice may be a two-dimensional (2D) image that represents a cross-section of the volume by the plane orthogonal to the previously chosen axis (stack orientation axis) at the specific location along this axis described by the index of the slice in the stack. For example, if the z-axis is chosen as a stack orientation axis, the slices will be 2D images containing data items (x, y, $z_i$) corresponding to all possible values of the (x, y) coordinates and having a fixed (i.e. same for all the items of the slice) coordinate z equal to $z_i$, where i is an index of the slice in the stack. Slices cover the entire image volume, and the number of the slices in the stack depends upon chosen value of a slice thickness—the distance between two neighbour slices.

Over time, a number of techniques have been developed for volume visualization (rendering) of volumetric data. When volumetric data are visualised as a stack of slices, important information about e.g. the shape of the internal anatomical structures of an imaged subject, may be lost. Conversely, techniques of volume rendering attempt to capture/employ three-dimensional data in a two-dimensional image which conveys the effect of volume visualization (rendering) presenting more visual information on e.g. the shape of the internal anatomical structures of an imaged subject. Volume rendering of volumetric data is a means by which meaningful information may be extracted from the volumetric data as a visualisation—typically for presentation as a two-dimensional image of such extracted data, or a set of such 2D images.

Volume rendering methods include methods for creating a 2D image (or data therefor) directly from volumetric data. Four methods of volume rendering are known in the art as: x-ray rendering; maximum intensity projection; isosurface rendering; full volume rendering. These four methods share two properties in common: Each employs the technique of casting "viewing rays" from image voxels, sampling volumetric data values at discrete locations along their ray path; and each determines the sampled volumetric data values using an interpolation of volumetric data (e.g., so-called "nearest-neighbour" sampling, linear interpolation, or any other interpolation method as would be readily apparent to the skilled person). The volume rendering method that is most frequently used in medical imaging applications is maximum intensity projection (MIP). This method projects the volumetric data into a 2D image (projection) using a system of parallel equispaced "viewing rays" passing through volumetric data. Each ray has associated with it sampled data values determined by interpolating values of volumetric data at discrete locations along its path. The projection image is finally formed of the maximal values of the sampled data along the paths of each one of the rays.

Magnetic Resonance Imaging (MRI) is an example of a method of imaging internal regions of a subject. Volumetric data may be acquired via MRI which comprises a set of data items each representing some predetermined physical property of the imaged subject, and which may each be represented as an element in an image of the subject. Such volumetric data items are commonly referred to as "voxels" (i.e., volumetric "pixels").

Different tissues within a subject typically produce a different response to a given MRI image acquisition event. Fatty tissues may image differently to blood vessels, which may in turn image differently to lesions. Often a "contrast agent" is introduced into the imaged region of the subject, the agent being chosen specifically for its property of accumulating within tissues of a particular type—such as lesion tissues—to enable an image of the region of interest to highlight or more clearly distinguish the tissues of interest from other tissues present there. That is to say, the tissue of interest is caused to be more sharply contrasted from other tissues in the imaged volume—this being typically referred to as "contrast enhanced". Of course, contrast agents, or substances having an equivalent effect, may be employed in industrial analysis of non-biological subjects for the purposes of similarly highlighting materials of regions of interest within the body of an imaged article/subject.

In a study of tissues within a biological subject (e.g., an animal or human), the manner of temporal changes in the image contrast of contrast-enhanced regions of interest, can provide valuable data regarding the type and nature of the tissue in question. The study and analysis of the manner of such temporal changes is known as Dynamic Contrast Enhanced imaging (e.g., imaging such as MRI).

The kinetics of enhancement due to the effect of a contrast agent used in DCE-MRI can be explained with some degree of simplification using the following physiological model. After administration, e.g. by intravenous bolus injection, the contrast agent is delivered into the blood plasma. Descending from the major arterial blood vessels to regional arterioles and then to capillaries, the contrast agent is delivered to tissues where it diffuses through the permeable capillary walls into the extra-cellular, extra-vascular space (EES) of the tissue (the space between cells). Transfer of the contrast agent into EES is accompanied by reflux back to the blood plasma when interstitial concentration becomes greater than vascular concentration until concentration of the contrast agent accumulated at the site of the tissue reaches dynamic equilibrium with the blood plasma concentration. The contrast is ultimately cleared from the blood plasma by kidneys (some low molecular weight contrast agents have substantial hepatic excretion also). Tending to maintain equilibrium with the blood plasma the contrast agent washes out of the tissue. Thus most tissues in the body (with exception for brain tissue) will exhibit a two-phase pattern of behavior: buildup of the contrast agent concentration followed by its washout. However, the time scale varies between tissues with different physiologic characteristics, displaying differences in the duration of the buildup phase, and the extent of maximal accumulated concentration of contrast agent.

An analysis of lesions in Dynamic Contrast Enhanced MRI (DCE-MRI) of tissues (e.g., the Breast) typically involves assessment of two factors: the extent of maximal enhancement during a specific time period after administration of the contrast agent; and, the manner of the temporal change of contrast agent uptake. The latter may be defined by the shape of a graphical plot or "kinetic" curve showing relative intensity vs. time (known as an "uptake curve") of a given imaged part, or parts, of an imaged tissue or article.

One of the problems associated with interpreting DCE-MRI of the Breast is distinguishing between lesions suspicious of malignancy and blood vessels. Blood vessels typically possess strong relative enhancement and often display contrast agent uptake properties similar to the uptake properties of most malignant lesions. Volume rendering by Maximum Intensity Projection of a "subtracted image" (i.e. from the image acquired after the contrast agent administration is subtracted a reference image acquired before the contrast administration, the result thus displaying effect of enhancement) may be used to distinguish between a blood vessel and a lesion. On 2D rendering images produced by such rendering the blood vessels are clearly recognizable due to their characteristic pipe-like tubular shape. The rendering using "subtracted" data accounts for shape of enhancing anatomical structures and the extent of the effect of enhancement at the time of acquisition of the rendered volume, but not for the information of a tissues' kinetics. This can cause difficulties in distinguishing between lesions and enhancing non-lesion tissue other than blood vessels (e.g., breast parenchyma). Breast parenchyma for example may produce strong enhancement, but different kinetics. Similar problems arise in distinguishing between materials in an imaged volume when using other volumetric image data acquisition techniques (Positron Emission Tomography, Computed Tomography etc) both in imaging biological tissues and in imaging other materials and articles.

The present invention aims to address this.

At its most general the invention proposes generating data for a two-dimensional image which identifies different classes of property of an imaged subject, this being done by separately rendering volumetric data classified into those different classes and, from all of those separate renderings, choosing one datum for use in the two-dimensional image (e.g., as an image pixel). This being repeatable for each datum to be used in the two-dimensional image—thereby, for example, to selectively build-up the data for whole of the two-dimensional image as a mixture/combination of different classes of data. The data for the two-dimensional image may be coded, or contain information, explicitly identifying the class to which it belongs. This enables easy class identification of data, and suitable visualisation methods to visually distinguish data of different classes within the two-dimensional image (e.g., colour coding). Thus, kinetic information may be incorporated into the volume renderings to enable tissues of different enhancement and kinetic characteristics to be identified as such.

In this way, the invention may enable the generation of a volume rendering of volumetric image data into a two-dimensional image which enables data of different classes—e.g., representing different physical properties of the imaged subject—to be clearly visualised and identified. The invention is particularly, though not exclusively, suited to use with volumetric data acquired via a Magnetic Resonance Imaging (MRI) procedure, and has applications not only in the field of medical imaging of human objects, but also imaging of animal objects, and other fields.

The property to be classified may be the displayed physiologic characteristics of the tissue affecting its contrast agent uptake kinetics, which is evaluated by assessment of the manner of temporal change of contrast agent uptake of a part of the imaged volume monitored over a specific time interval following administration of the contrast agent. The property is imaged as a corresponding temporal change in the relative intensity/value of the volumetric image data point(s) (e.g., "voxel(s)", or sampled data points calculated from amongst/between such voxels) representing that part of the imaged volume. For example, this may be classified in one of the following classes: persistent contrast enhancement of the intensity of the voxel(s) or sample(s); washout of the intensity of the voxel(s) or sample(s); or, a plateau in the uptake curve of the voxel(s) or sample(s) (equivocal). Washout refers to a persistent decrease in voxel intensity subsequent to an initial increase. Persistent enhancement, as opposed to washout, characterizes a tissue where the duration of the build-up phase of the contrast agent concentration at the site of the tissue is longer then the specifically selected measurement time. Thus this classification reflects kinetic properties of the tissue.

It is to be understood that the presented invention is not limited to any specific method of classification of volumetric data based on displayed kinetic properties of the tissue. Other methods may be employed as would be apparent to the skilled person. Examples include: methods of classification by or including assessing the shape of an uptake curve by analysing rates of change (e.g. gradients) along the curve using the whole range of the curve's data points or only a subset of data points, statistical inference using the values of an uptake curve's data, as well as methods based on modelling of an uptake curve using parametric functions with subsequent classification based on inferred values of the parameters.

One suitable method of rendering volumetric data (i.e., volume rendering) is a method known as Maximum Intensity Projection (MIP). As would be readily apparent to the skilled person, MIP is a method of identifying data items (voxels) from a volumetric data set to represent those data items as a two-dimensional projection, on a visualisation plane, the data samples with maximum intensity which are sampled along any given one of a plurality of "viewing rays/lines" traced from a notional viewpoint of the volumetric data, through a part of that data to the plane of projection or view plane. Other volume rendering methods may be employed according to the invention as would be readily apparent to the skilled person. Examples include: x-ray rendering.

Accordingly, in a first of its aspects, the invention may provide a method of generating data for use in constructing a two-dimensional image rendered from a time sequence of volumetric data sets each representing a subject in three spatial dimensions at one (e.g. a respective one) of a succession of times (e.g., different times) within the time sequence, the method including:

classifying samples (e.g. voxels) of the volumetric data into one of a plurality of sample (e.g. voxel) classes according to changes in the value of a respective sample (e.g. voxel) within the time sequence;

determining pixel values from samples (e.g. voxels) in different respective sample (e.g. voxel) classes according to a rendering of volumetric data within a respective sample (e.g. voxel) class;

selecting from amongst said pixel values one pixel value for use in constructing said two-dimensional image.

The samples of the volumetric data may be simply the actual values of voxels of that data, or may be values of volumetric data calculated e.g. via an interpolation, from amongst/between the values of voxels at positions neighbouring or adjacent the position at which the sample is determined within the volume. The samples may use all, or only some, of the voxels of a given volumetric data set. It may be that not all available (e.g. possible/generated) samples of a volumetric data set are employed in implementing the invention and any desired subset of such samples (e.g. a subset of voxels) may be employed if required.

It is to be understood that one, some or all pixel values for one some or all pixel positions within a 2D rendering may each be selected according to the invention. The invention may include constructing the 2D rendering using those one, some or all selected pixel values, and may include generating data in this way for a plurality of different 2D renderings of a given image subject—each taken e.g. from a different viewing position—and may include constructing each/all such 2D renderings.

Each of said pixel values may be determined from samples (e.g. voxels) in a respective one of each of said plurality of sample (e.g. voxel) classes.

The aforesaid step of determining may include:
(a) determining a pixel value from samples (e.g. voxels) in a sample (e.g. voxel) class according to a rendering of volumetric data within the sample class;
(b) repeating step (a) one or more times to determine each time another pixel value from samples (e.g. voxels) in a different sample (e.g. voxel) class according to a rendering of volumetric data within the different sample class.

The aforesaid selecting may include comparing a pixel value with a comparison value; and selecting the pixel value for use in constructing said two-dimensional image if said pixel value exceeds said comparison value, otherwise selecting a different pixel value therefore (e.g. either without further comparing, or by further employing an aforesaid comparing step).

The pixel value(s) so determined may correspond to the same image element position in said two-dimensional image according to each respective said rendering of volumetric data. That is to say, whichever of the pixel values is selected, it may be selected to be employed in the same pixel of the two-dimensional image. Each respective said rendering of volumetric data is preferably a volume rendering employing the same direction of view through the volumetric data. Each respective rendering of volumetric data is preferably a volume rendering using a Maximum Intensity Projection (MIP) methodology employing a line of view (viewing ray) passing or extending through the volumetric data at a point along which a pixel value is determined. For example, when rendering is done using MIP methods, it is preferable that each pixel value is determined at a respective point along a "viewing ray/line" which is parallel and collinear with the "viewing ray/line" along which said other pixel value(s) are determined. For example, the viewing rays/lines may be the same ray/line.

The methodologies of MIP such as would be readily apparent to the skilled person may be employed to this end. The determining of pixel values according to a rendering of volumetric data may include:
defining a viewing ray, in accordance with a volume rendering (e.g. MIP) methodology, to pass through volumetric data comprising voxels of a plurality of voxel classes (e.g. some or all voxel classes) collectively (i.e. together); sampling (e.g., calculating) voxel values at predetermined points along the viewing ray; assigning an appropriate sample (e.g. voxel) class to each sample value so sampled; in accordance with the volume rendering methodology, selecting a sample value from amongst only those sampled values of one common class.

The assignment of an appropriate sample (e.g. voxel) class to a sample value may include identifying the voxel(s) from which the sample value was calculated or with which it is associated, and assigning to the sample value a voxel class chosen from the voxel class/classes of those identified voxel(s). For example, the assignment may be of the voxel class of the voxel nearest to the position along the viewing ray at which the sample value in question is calculated (e.g. the class of the voxel which is "nearest neighbour" to the position at which the sample value is calculated). Other assignment methods may be used, such as assigning the class of the voxel which has the dominant contribution to the calculated sample value when that value is calculated using the values of several (e.g. neighbouring) voxels—which may have different classes—via, for example, a method of interpolation amongst the several voxel values and positions.

The aforesaid assigning may include calculating sample values at the same predetermined sample positions along the same viewing ray through a plurality of the successive volumetric data sets of the time sequence, and then, for each sampling position, assessing the manner of temporal change of the plurality of sample values (due to the effect of contrast enhancement over the time sequence) associated with the sampling position, and then classifying the samples associated with the sampling position according to manner of temporal change so assessed (e.g. "fast", or "slow" etc). This amounts to performing classification of sample positions after interpolation amongst voxel values, as opposed to classifying voxels and interpolating amongst classified voxel values/positions to obtain and classify sample values.

For example, the assigning may include:
(i) defining a viewing ray through a volumetric data set of the time sequence of data sets;
(ii) sampling volumetric data at sample points along the ray;
(iii) using the same ray, repeating steps (i) and (ii) for some (e.g. all) other volumetric data sets of the time sequence useable for classification (e.g. only a subset of three data sets associated with the imaged subject before the administration of the contrast material and at two specific time points after contrast agent has been applied corresponding to initial and late phases of enhancement) to produce a time sequence of sample values for each sample point;
(iv) determining the class of a sample according to the manner of temporal change of the sample values at the same sample point during the time sequence (e.g. the uptake curve for the sample point);
(v) repeating (iv) for all sample points along the ray thereby to classify all samples sampled along it.

Alternatively, the determining of pixel values according to a rendering of volumetric data may include: defining a viewing ray, in accordance with a volume rendering (e.g. MIP) methodology, to pass through volumetric data comprising voxels of only one chosen voxel class wherein the voxel positions of voxels within the volumetric data associated with other classes are set to a null (e.g. zero) value; sampling voxel values at predetermined points along the viewing ray; assigning an appropriate voxel class to each sample value so calculated (e.g. either the chosen class, else a null voxel class if the sample is wholly or predominantly associated with null voxels); in accordance with the volume rendering methodology, selecting a sample value from amongst only those sample values of said one chosen class.

The calculation of sample values at points along the viewing ray may employ suitable interpolation technique such as would be readily apparent to the skilled reader. Examples include: "nearest neighbour" interpolation wherein a sample value is calculated to be the voxel value of the voxel nearest to the position along the viewing ray associated with the sample value in question; linear, polynomial (or any other) interpolation of voxel values amongst a group of neighbouring voxels between/adjacent which the aforesaid position resides.

Thus, the step of determining a sample value may employ a rendering methodology applied such that sample values of a plurality of classes along a viewing ray are calculated collectively, or such that sample values of one chosen class along a viewing ray are calculated separately, but final determination (rendering) of a given pixel value is made from a choice of a sample value from amongst only those sample values of one class along the ray—even though such sample values may have been calculated using (in part) voxels of another class.

The comparison value may be a said another pixel value or the comparison value may be a predetermined threshold value. Thus, the comparison may involve comparing the value of one pixel to that of another, and selecting the larger of the two, or selecting the smaller of the two. Alternatively, a pixel value may be compared to some fixed threshold value, a given pixel value being selected if its value exceeds that of the threshold (or, alternatively, if it does not so exceed), and a different pixel value being selected otherwise.

The said another pixel value may be determined from samples (e.g. voxels) in any one of a plurality of said different sample/voxel classes. The method may include determining a plurality of pixel values, each from samples (e.g. voxels) in a different respective class, according to a rendering of volumetric data within the respective class, wherein one of the plurality of samples/voxels is selected as said different pixel value (and different class) according to the result of the comparison of a previous pixel value to the comparison value (e.g., if the value of said previous pixel value does not exceed the comparison value). In this way, many sample/voxel classes may be represented in the data for the two-dimensional image thereby enabling that image to show those many classes in one combined visualisation.

The method may include selecting a pixel value if it exceeds the value of any other of pixel value determined as described above. For example, given n (n=integer) pixel values: p1; p2; p3; ... pn, each determined from a respective different class, a pixel value may be selected therefrom according to the procedure $$\max(p1, p2, p3, \ldots pn).$$

The function "max(...)" is to select that pixel value having the maximum value—i.e. pixel intensity. The method may include other approaches to selecting a pixel value such as by combining the principles mentioned above, e.g., evaluating the maximum pixel value of a number of pixel values, and/or comparing a/each pixel value with a predefined threshold value(s).

An uptake curve associated with a sample (e.g. a voxel) of volumetric data embodies changes (if any) in the value of the respective sample within the time sequence. Each class may be defined according to a property of an uptake curve, such as: values of its gradient(s) at any number of points along the curve; the shape of the curve; the values of parameters used to mathematically (or otherwise) define or describe the curve or a part of it, or the like.

Preferably, each said class is defined according to a rate of change of the value of a voxel during the time sequence. A class is preferably distinguished from any other class according to any one of: a said rate of change displaying persistently negative value within some of the time sequence; a said rate of change displaying a persistently substantially negligible or zero value within the time sequence (e.g. a plateau); a said rate of change displaying persistently positive value during substantially all of the time sequence.

The method may include assigning, in a given voxel class, a null voxel value to the position of voxels not classified in that class, the null voxel value being representative of the absence of a volumetric data for that voxel position in that class. In this way, if a region of the imaged volume contains nothing but one class of voxels, and a viewing ray of an MIP rendering of a different class is employed which passes only through that region, the data in that different class could not provide a voxel which the viewing ray could sample. However, by generating null voxel values to nominally represent voxels in that region, the viewing ray would be provided with nominal voxels to sample. The null voxel value could be a value of zero, for example, or some other constant value representative of the absence of true voxel data. Null voxels may be assigned a null class identifying them as such.

The method may include assigning to sample (e.g. voxel) values in each sample/voxel class a colour different from the colour assigned to sample/voxel values in another sample/voxel class, such that elements of the two-dimensional image associated with one sample/voxel class are presentable as coloured differently to elements of the two-dimensional image associated with another sample/voxel class.

The method may include initially acquiring said time sequence of volumetric data sets.

The method may include constructing the two-dimensional image subsequent to generating the data therefore as a volume rendering of the volumetric data.

The volumetric data sets preferably represent a subject imaged according to a magnetic resonance imaging (MRI) procedure.

It is to be understood that the above methods may be implemented using appropriate apparatus, and that the invention, in other aspects, may encompass apparatus arranged or operable to implement any of the above methods.

In a second of its aspects, the present invention may provide apparatus for generating data for use in constructing a two-dimensional image rendered from a time sequence of volumetric data sets each representing a subject in three spatial dimensions at one of a succession of times within the time sequence, the apparatus including:
  classifying means for classifying samples (e.g. voxels) of the volumetric data into one of a plurality of sample (e.g. voxel) classes according to changes in the value of the respective sample (e.g. voxel) within the time sequence;
  determining means for determining pixel values from samples (e.g. voxels) in different respective sample (e.g. voxel) classes according to a rendering of volumetric data within the respective sample (e.g. voxel) class;
  selecting means for selecting from amongst said pixel values one pixel value for use in constructing said two-dimensional image.

The determining means may be operable to determine each of said pixel values from samples (e.g. voxels) in a respective one of each of said plurality of sample (e.g. voxel) classes. The determining means is operable to:
  (a) determine a pixel value from voxels in a voxel class according to a rendering of volumetric data within the voxel class;
  (b) repeat step (a) one or more times to determine each time another pixel value from voxels in a different voxel class according to a rendering of volumetric data within the different voxel class.

The apparatus may include comparing means operable for comparing a pixel value with a comparison value, in which said selecting means may be arranged to select a pixel value for use in constructing said two-dimensional image if said pixel value exceeds said comparison value, otherwise to select a different pixel value therefor.

The determining means may be arranged such that the pixel values determined thereby correspond to the same image element position in said two-dimensional image according to each respective said rendering of volumetric data.

The identifying means may be arranged such that each respective said rendering of volumetric data is a volume rendering employing the same direction of view through the volumetric data.

The comparison value may be the pixel value of a said another pixel value, or may be a predetermined threshold value.

The determining means may be arranged to perform each respective said rendering of volumetric data as a volume rendering using a Maximum Intensity Projection (MIP) methodology employing a line of view passing through the volumetric data at a position along which a pixel value is determined. The determining means may be arranged to determine said another pixel value from samples (e.g. voxels) in any one of a plurality of said different sample (e.g. voxel) classes.

The determining means may be arranged to determine a plurality of pixel values each from samples (e.g. voxels) in a different sample/voxel class according to a rendering of volumetric data within the respective voxel class, wherein said selecting means may be arranged to select one of said plurality of pixel values.

The classifying means may be arranged to define each said class according to a property of the uptake curve associated with a given sample (e.g. a voxel).

The classifying means may be arranged to define each said class according to a rate of change of the value of a sample (e.g. a voxel) during said time sequence. The classifying means may be arranged to distinguish a class from any other class according to any one of: a said rate of change displaying persistently negative value within said time sequence; a said rate of change displaying a persistently substantially negligible or zero value within said time sequence (e.g. a plateau); a said rate of change displaying persistently positive value during substantially all of said time sequence. The classifying means may be arranged to assign in a given sample (e.g. a voxel) class a null sample/voxel value to samples/voxels not classified in that class, the null sample value being representative of the absence of a volumetric data.

The classifying means may arranged to assign to sample (e.g. voxel) values in each sample (e.g. voxel) class a colour different from the colour assigned to sample/voxel values in another sample class, such that said pixel values associated with one sample class are presentable as coloured differently to said pixel values associated with another sample class.

The apparatus may include image data acquisition means arranged to initially acquire said time sequence of volumetric data sets. The apparatus may include image construction means arranged to construct said two-dimensional image subsequent to generation of said data therefore as a volume rendering of said volumetric data. The volumetric data sets may represent a subject imaged according to a magnetic resonance imaging (MRI) procedure.

In a further aspect, the invention may provide a computer program arranged to execute the method of the invention in its first aspect when run on a computer means.

In a yet further aspect, the present invention may provide a computer program product storing a computer program according to the computer program described above. In another aspect, the invention may provide a computer programmed according to the computer program described above.

There now follow examples of the invention described with reference to the accompanying drawings of which:

FIG. 1 illustrates a schematic representation of a 2D rendering of volumetric image data using a ray casting volume rendering methodology;

FIG. 2 schematically illustrates the determination of a pixel value from voxels of differing voxel classes;

Figure 1:
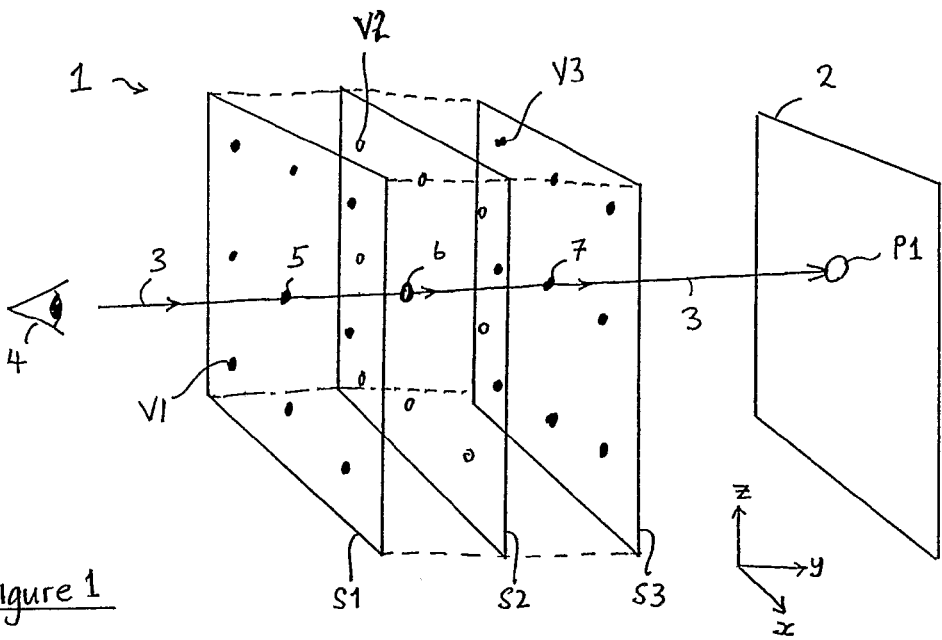

FIG. 1 illustrates volumetric data 1 including data items ("voxels") defined according to a three-dimensional reference frame within which an imaged subject resided during imaging. Each voxel (v1, v2, v3 etc) has associated with it a three-dimensional coordinate (x, y, z) defined in accordance with the reference frame in question. The volumetric data is represented as a stack (ordered set) of volume slices (s1, s2, s3). Each slice is a two-dimensional (2D) image that represents a cross-section of the volume by the plane orthogonal to the previously chosen axis (stack orientation axis—the y-axis here) at the specific location along this axis described by the index of the slice in the stack.

An example of a Maximum Intensity Projection (MIP) volume rendering is schematically illustrated in FIG. 1 for creating a pixel p1 for a 2D image 2 rendered from voxels within the volumetric data 1. The MIP rendering of pixel p1 employs the technique of casting a "viewing ray" 3 through the volumetric data 1 from a notional viewing position 4. Samples (voxels 5, 6, 7) of the volumetric data values are made at discrete locations along the ray path. In this example, the ray path 3 intersects a voxel location (voxels 5, 6, 7) in each one of the successive three volume slices (s1 to s3) intersected by the ray 3. From these three samples, the MIP methodology calculates which of the three samples has the maximum voxel value (intensity/brightness) and selects that voxel value as the value for the pixel p1 in the 2D image rendering at the point on the 2D image plane 2 intersected by the viewing ray 3. In this simple, but illustrative, example, the second intersected voxel 6 is deemed the one having maximum intensity of the three voxels (5, 6 and 7) and its value is used to represent pixel p1 in the 2D rendering 2.

More generally, a viewing ray may not intersect exactly a voxel position within volumetric data and the sampling of volumetric data values may employ an interpolation of volumetric data in order to estimate the value of volumetric data at the sampling position along the ray using adjacent volumetric data values (e.g., so-called "nearest-neighbour" sampling, linear interpolation, or any other interpolation method as would be readily apparent to the skilled person).

Using a plurality of parallel equispaced such "viewing rays" 3, passing through volumetric data 3 at spaced locations, each ray has associated with it sample values determined by interpolating values of volumetric data at discrete locations along its path. Each such ray identifies a maximal sampled data value (e.g. interpolated) which will be used as the pixel value within the 2D rendering at the location where the ray intersects the 2D plane of that rendering. The projection image is finally formed from a plurality of pixels each being the maximal value of the interpolated data along the path of a respective one of a plurality of rays.

A preferred embodiment of the invention comprises generating data for a two-dimensional image which identifies different classes of property of an imaged subject. The pixel value of each pixel for the two-dimensional image is formed by separately rendering volumetric data classified into those different classes according to an MIP volume rendering methodology and, from all of those separate renderings, choosing one datum for use in the two-dimensional image as an image pixel value. The method may be applied to the formation of each pixel value to be used in the 2D image thereby to selectively build-up the data for whole of the two-dimensional image as a mixture/combination of different classes of data/pixel. Each pixel value for the two-dimensional image so formed is coded (e.g. contains information) to explicitly identify the class to which it belongs to enable class identification of pixels of the 2D image visually distinguish pixels of different classes within the two-dimensional image (e.g., by colour coding). The method is applicable to a time sequence of volumetric data sets each representing a subject in three spatial dimensions at one (e.g. a respective one) of a succession of times (e.g., different times) within the time sequence.

The property classified is the manner of temporal change of contrast agent uptake at a voxel of the imaged volume, this being imaged as a corresponding temporal change in the relative intensity/value of the voxel(s) representing that part of the imaged volume.

Figure 2:
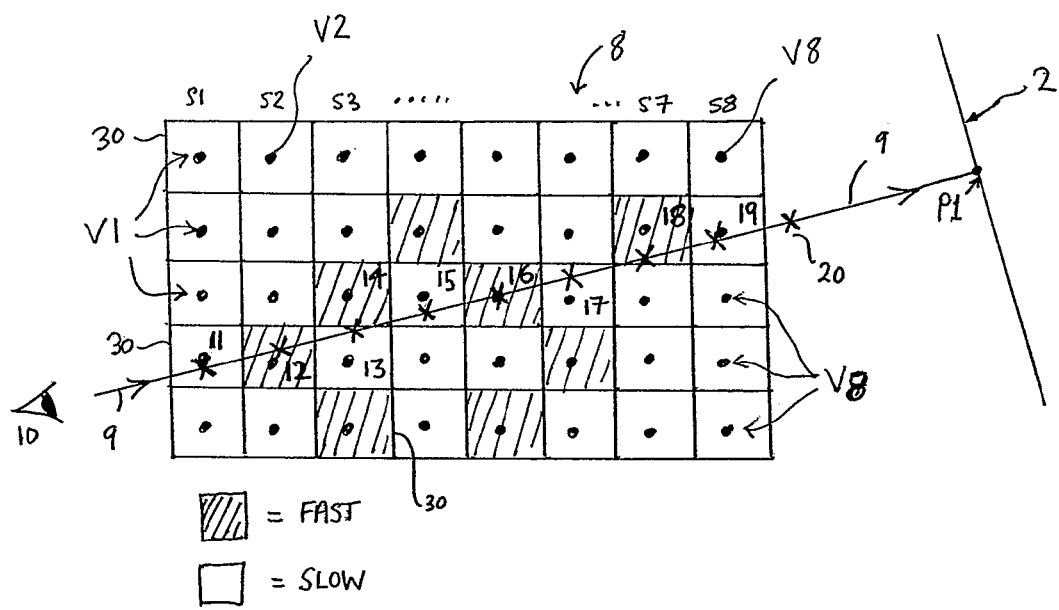

FIG. 2 schematically illustrates an application of the preferred embodiment of the invention to one volumetric data set from an aforesaid time sequence to produce a rendering of a pixel p1 from volumetric image data 8 comprising voxels of two distinct voxel classes.

First, the manner of the temporal change, during the time sequence, in the voxel value of each voxel position of the volumetric data is determined and classified into one of a number of voxel classes according to changes in the value of a respective voxel within the time sequence. Voxels are classified in to one of the following classes: persistent contrast enhancement of the intensity of the voxel; washout of the intensity of the voxel; or, a plateau in the uptake curve of the voxel (see FIG. 3). Final classification classifies voxels as "fast" uptake voxels if they are of the washout or plateau type, and as "slow" voxels otherwise (e.g., of the "persistent" type).

FIG. 2 represents a volumetric data set 8 comprising eight successive volume slices (s1, s2 . . . s8) each comprising a plurality of voxels (v1, v2 . . . v8) defining the respective slice. Each voxel is notionally considered to reside at the centre of a respective cubic voxel cell 30 which collectively define a cubic lattice of voxel cells. A viewing ray 9, originating from a notional viewing point 10, passes through each of the eight slices of the volumetric data in succession, and at each slice passing through one voxel cell thereof before exiting the volume and intersecting the 2D viewing plane 2 at a point thereupon defining the position of the pixel the value of which the subsequent rendering and selection process will determine and select. The voxel cells of the volumetric data 8 have been classified as containing "fast" voxels (such as voxels 12, 14, 16 and 18) or "slow" voxels (such as voxels 11, 13, 15, 17 and 19).

Next, for each voxel class, a pixel value associated with a given class is determined from voxels in the respective voxel class according to a rendering of volumetric data within the respective voxel class. Each pixel value determination is a volume rendering using a Maximum Intensity Projection (MIP) methodology employing the same viewing ray 9 passing or extending through the volumetric data 8. The determination includes defining a viewing ray 9, in accordance with an MIP volume rendering methodology, to pass through voxel cells 11, 12, 13, 14, 15, 16, 17, 18 and 19 being of a mixture of "fast" and "slow" voxel classes (i.e. all possible voxel classes employed). A plurality of sample values are then calculated at predetermined regularly spaced sampling points 20 (marked "x" on ray 9 of FIG. 2) along the viewing ray. A voxel class ("fast" or "slow") is assigned to each such sample value so calculated at the sampling points along the viewing ray 9.

The assignment of an appropriate voxel class to a calculated sample value may include identifying the voxel(s) from which the sample value was calculated or with which it is associated, and assigning to the sample value a voxel class chosen from the voxel class/classes of those identified voxel(s). For example, the assignment may be of the voxel class of the voxel nearest to the position along the viewing ray at which the sample value in question is calculated (e.g. the class of the voxel which is "nearest neighbour" to the position at which the sample value is calculated). In the present example, the class assigned to a sample value is equal to that of the voxel cell within which the sampling point "x" is located. Thus, the successive sampling points located within voxel cells 11, 12, 13, 15, 16, 17, 18 and 19 have assigned to them the following respective classes: slow, fast, slow, slow, fast, slow, fast and slow.

Other assignment methods may be used, such as assigning the class of the voxel which has the dominant contribution to the calculated sample value when that value is calculated using the values of several (e.g. neighbouring) voxels—which may have different classes—via, for example, a method of interpolation amongst the several voxel values and positions. The calculation of sample values at points along the viewing ray may employ suitable interpolation technique such as would be readily apparent to the skilled reader. Examples include: "nearest neighbour" interpolation wherein a sample value is calculated to be the voxel value of the voxel nearest to the position along the viewing ray associated with the sample value in question; linear, polynomial (or any other) interpolation of voxel values amongst a group of neighbouring voxels between/adjacent which the aforesaid position resides.

Determination of a pixel value according to the rendering is achieved by subsequently choosing a pixel value from amongst only those calculated sample values of one common class. This achieves and completes the rendering of a pixel value in one class, chosen from sample values calculated in respect of only those sampling locations ("x") along the viewing ray 9 associated with the same class—ignoring those associated with any other class. Thus, the step of determining a pixel value may employ a rendering methodology applied such that sample values of a plurality of classes along a viewing ray are calculated collectively but final determination (rendering) of a given pixel value is made from a choice of a pixel value from amongst only those sample values of one class along the ray—even though such sample values may have been calculated using voxels of another class.

Alternatively, the determining of pixel values according to a rendering of volumetric data 8 may include: defining a viewing ray 9, in accordance with an MIP volume rendering methodology, to pass through volumetric data comprising voxels of only one chosen voxel class (e.g. "fast" only) wherein the voxel positions of voxels within the volumetric data associated with other classes (e.g. "slow") are set to a null (e.g. zero) value; calculating sample values at predetermined sampling points "x" along the viewing ray; assigning an appropriate voxel class to each sample value so calculated; in accordance with the MIP volume rendering methodology, selecting a pixel value from amongst only those calculated sample values of said one chosen class. Referring to FIG. 2, this alternative method may, for example, involve rendering only "fast" voxel data by setting all "slow" voxel values to zero, and performing the sampling at points "x" which either fall within a "fast" voxel cell 30 or a zero-valued "slow" voxel cell 30. Rendering of the "slow" class of voxels along the same ray 9 would thus require restoring the "slow" voxel values and setting those of the "fast" voxels to zero prior to sampling.

Where there are more than the two voxel classes, "fast" and "slow", the determination of pixel values may be generalised to include a determination of a pixel value from each class (e.g. 3 classes: "washout", "plateau", persistent"). The aforesaid step of determining would then include:
(a) determining a pixel value from voxels in a voxel class according to an MIP rendering of volumetric data within the voxel class;
(b) repeating step (a) one or more times to determine each time another pixel value from voxels in a different voxel class according to a rendering of volumetric data within the different voxel class.

Once all pixel value determinations are made for all classes, the method involves a final selecting, from amongst the determined pixel values, one pixel value for use in constructing said two-dimensional image.

The selecting may include comparing a/each pixel value with a comparison value; and selecting the pixel value for use in constructing the two-dimensional image if said pixel value exceeds the comparison value, otherwise selecting a different pixel value therefore (e.g. either without further comparing, or by further employing an aforesaid comparing step). The selecting may be selecting, from amongst the determined pixel values, the one having the highest value (i.e. greatest intensity/brightness), but may include comparing a pixel value of one class to a threshold value and selecting that pixel value if it exceeds the threshold, while selecting a different pixel value from amongst the remaining one or more determined pixel values. The selecting of the different pixel value may involve the same general comparison procedure as undergone by the unselected previous pixel value.

Of course, the preferred method described above is to be applied to the generating of each pixel value for each pixel to be employed in the 2D rendering 2 if the volumetric data 8 by employing a new viewing ray parallel to any above described ray 9, but displaced therefrom so as to intersect the 2D image plane 2 at another location.

A further example of the method consists of the following steps illustrated with reference to examples of the intermediate and final renderings discussed above concerning imaged Breast tissue. First, all the voxels in an imaged volume are classified into two classes: voxels representing tissue with fast uptake kinetics; and, voxels representing tissue with slow uptake kinetics.

Figure 3:
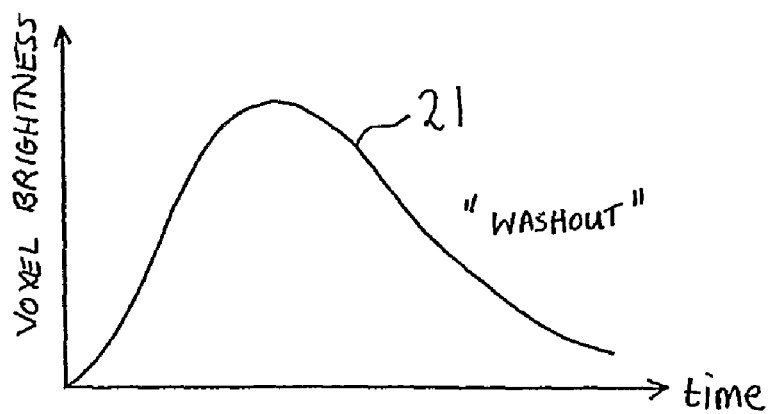
FIG. 3 illustrates washout, plateau, and persistent enhancement uptake curves for a voxel.
Figure 3:
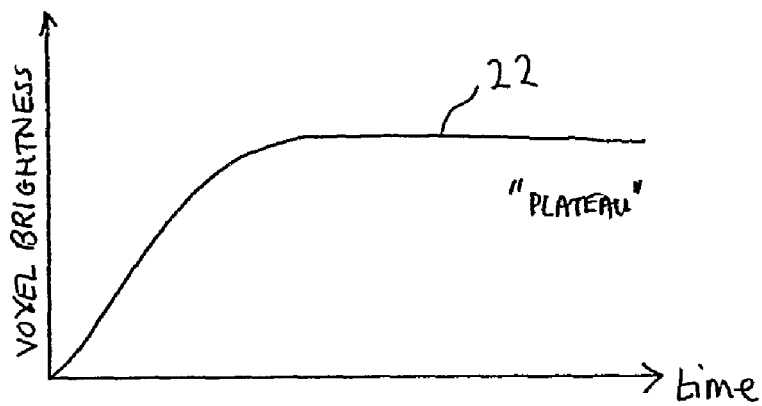
Figure 3:
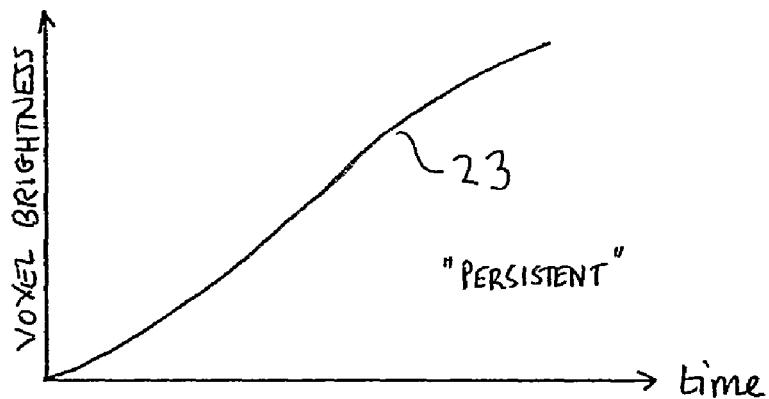

The type of the uptake kinetics is identified by assessing shape of the voxels' uptake curves. In this example, "fast" uptake kinetics includes voxels displaying washout or plateau shape of uptake curves, while "slow" uptake kinetics includes voxels with the uptake curves displaying persistent enhancement. FIG. 3 illustrates schematically uptake curves of these types.

Figure 4:
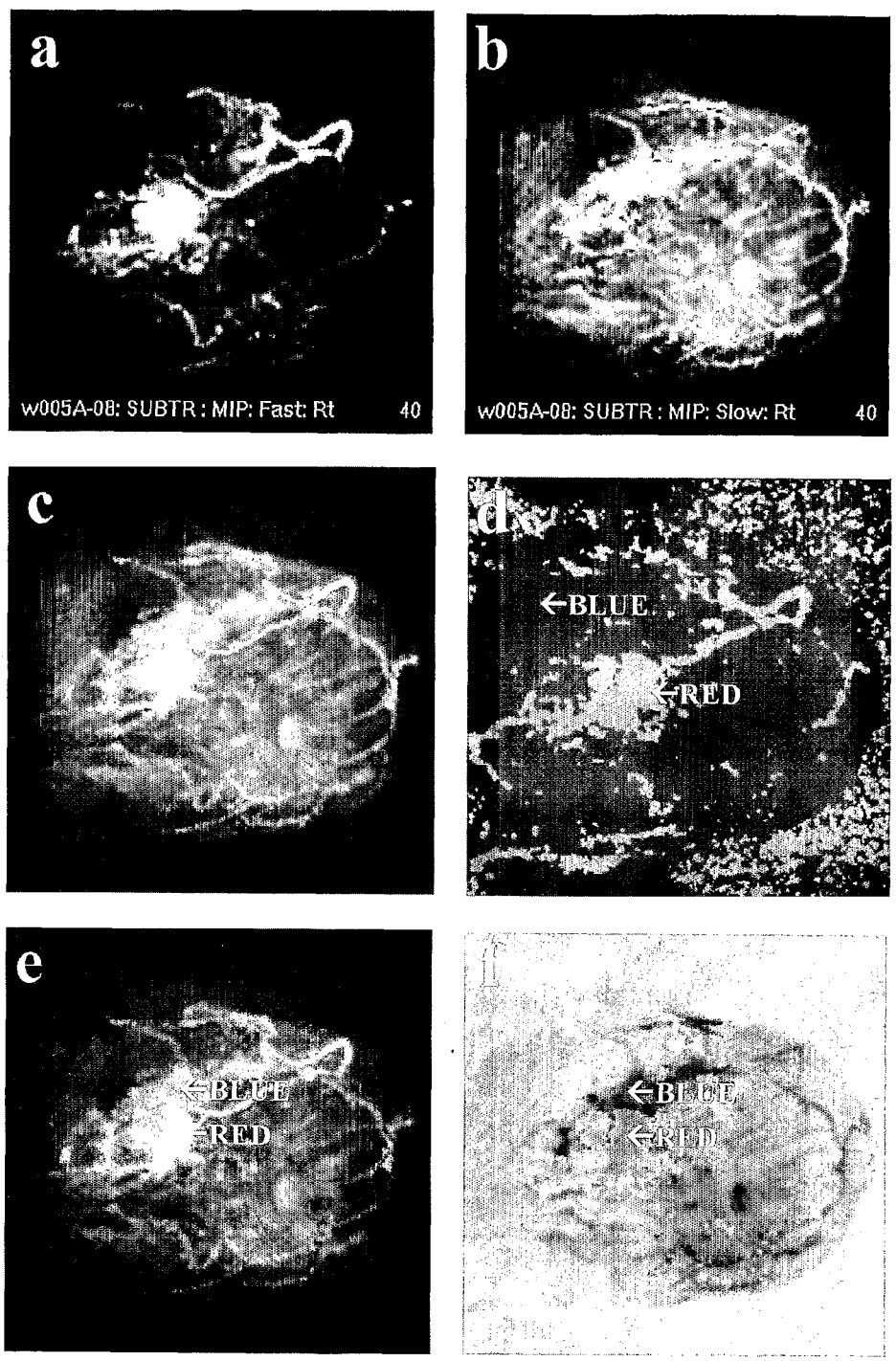
FIG. 4a illustrates an MIP volume rendering of volumetric data rendering voxels within one voxel class—the class of voxels displaying plateau or washout uptake curves ("fast" class)
FIG. 4b illustrates an MIP volume rendering of volumetric data rendering voxels within one voxel class—the class of voxels displaying persistent uptake curves ("slow" class)
FIG. 4c illustrates an image resulting from the selective combination of the renderings of FIGS. 4a and 4b.
FIG. 4d illustrates a colour coded map of the classes of pixels employed in the rendering of FIG. 4c—red="fast", blue="slow"
FIG. 4e illustrates an image resulting from the selective combination of the renderings of FIGS. 4a and 4b, colour coded according to the map of FIG. 4d using a semi-transparency algorithm in which the transparency value is 0.8.
FIG. 4f illustrates an image resulting from the selective combination of the renderings of FIGS. 4a and 4b, colour coded according to the map of FIG. 4d using a saturation modulation algorithm.

Second, maximum intensity projections are computed independently for each class (i.e. using the voxels of one of the classes at a time) producing two independent MIP renderings of the tissues with "fast" uptake kinetics ($MIP_{Fast}$), such as illustrated in FIG. 4a, and "slow" uptake kinetics ($MIP_{Slow}$), such as illustrated in FIG. 4b.

Subsequently, the two resulted MIP images are selectively combined in a pixel-by-pixel manner into a single image ($MIP_{Combined}$) using the following selective rule of combination for each pixel:

$$MIP_{Combined} = \max(MIP_{Fast}, MIP_{Slow}) \quad (1)$$

thus forming a selectively combined intensity image as illustrated in FIG. 4c.

For each pixel in the selectively combined intensity image, the information of its class is stored in the colour-encoded kinetic map (as illustrated in FIG. 4d) containing value RED if the voxel came from the MIP of the fast uptake tissue, or BLUE otherwise (the hues may be subject to the custom selection).

The selectively combined intensity image and the kinetic map are then fused together into a true colour two-dimensional image where colour is defined by the manner of contrast agent uptake over time (the "kinetics" thereof) described by the kinetic map. The intensities of pixels in the map are modulated by the extent of enhancement described by the combined intensity image. The fusion can be done using one of the following two approaches: semi-transparency algorithm with the selectively combined intensity image as a background and the kinetic map as a foreground (such as is illustrated in FIG. 4e), and saturation modulation algorithm composing the final true colour image via HLS (Hue, Lightness, Saturation) colour model using the kinetic map as a Hue, the combined intensity image as a Saturation, and assuming constant value of Lightness (such as is illustrated in FIG. 4f).

Figure 5:
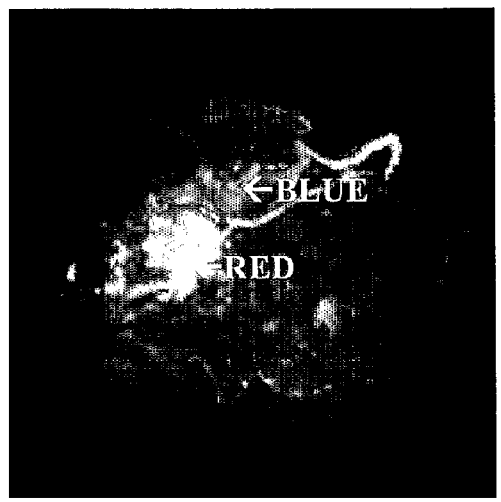
FIG. 5 illustrates an image resulting from the selective combination of the renderings of FIGS. 4a and 4b colour coded according to the map of FIG. 4d.

As an alternative to the rule of selective combination defined above in equation (1), a selective combination rule, for producing the selectively combined intensity image, may employ a simple threshold comparison. For example, the combination rule may be such that a voxel of the MIP rendering of a given class of tissues (e.g., the class of fast uptake tissues) found to be above certain threshold, is selected for use in representing a given pixel in the combined intensity image, otherwise a pixel from another class (e.g., pixels of the MIP of slow uptake tissue) is employed to represent that image pixel in the combined intensity image (such as illustrated in FIG. 5).

Figure 6:
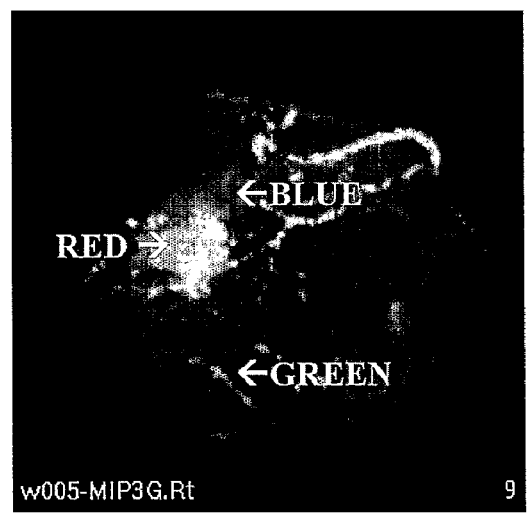
FIG. 6 illustrates a colour coded image resulting from the selective combination of three renderings of volumetric data each according to one of three different classes— red="washout" uptake, green="plateau" uptake, blue="persistent" uptake.

The selection methodology may be employed using more than two classes of uptake kinetics. For instance, the class representing fast uptake can be divided into two: voxels with washout type uptake curves and voxels with the plateau uptake curves. An MIP rendering may then be performed upon each of these classes of voxel separately. Subsequent selection of pixels for the final 2D combined image rendering (such as is illustrated in FIG. 6) may then be performed according to the following rule:

$$MIP_{Combined} = \max(MIP_{Washout}, MIP_{Plateau}, MIP_{Persistent}). \quad (2)$$

The examples described above, and the invention in general, may be used in conjunction with "subtracted images"—these being images formed by subtracting from an image of a subject containing a contrast agent, an image of the same subject containing no such agent. Furthermore, colour encoded maps of contrast agent uptake kinetics may be generated according to the present invention. The invention allows fast overview of the subject imaged volume (e.g., Breast volume) with improved appreciation of the anatomy providing a 3D volume rendering of the anatomical structures most susceptible to the contrast agent and most preferably fused with colour encoded contrast agent uptake ("kinetic") information. Thus the invention takes into account two major factors of, for example, tumour assessment—those being: the extent of image enhancement; and, the manner and form of contrast agent uptake dynamics/kinetics.

The invention claimed is:

1. A method of generating data for use in constructing a two-dimensional image rendered from a time sequence of volumetric data sets each representing a subject in three spatial dimensions at one of a succession of times within the time sequence, the method including:
   classifying samples of the volumetric data into one of a plurality of sample classes according to changes in the value of a respective sample within the time sequence;
   determining pixel values from samples in different respective samples classes according to a rendering of volumetric data within a respective samples class;
   selecting from amongst said pixel values one pixel value for use in constructing said two-dimensional image.

2. A method according to claim 1 in which each of said pixel values is determined from samples in a respective one of each of said plurality of samples classes.

3. A method according to claim 1 in which said determining includes:
   (a) determining a pixel value from samples in a sample class according to a rendering of volumetric data within the sample class;
   (b) repeating step (a) one or more times to determine each time another pixel value from samples in a different sample class according to a rendering of volumetric data within the different sample class.

4. A method according to claim 1 in which said selecting includes comparing a pixel value with a comparison value; and selecting the pixel value for use in constructing said two-dimensional image if said pixel value exceeds said comparison value, otherwise selecting a different pixel value therefore.

5. A method according to claim 1 in which the pixel values so determined correspond to the same image element position in said two-dimensional image according to each respective said rendering of volumetric data.

6. A method according to claim 1 in which each respective said rendering of volumetric data is a volume rendering employing the same direction of view through the volumetric data.

7. A method according to claim 4 in which said comparison value is a said another pixel value.

8. A method according to claim 4 in which said comparison value is a predetermined threshold value.

9. A method according to claim 1 in which each respective said rendering of volumetric data is a volume rendering using a Maximum Intensity Projection (MIP) methodology employing a line of view passing through the volumetric data at a point along which a pixel value is determined.

10. A method according to claim 1 wherein said another pixel value is determined from samples in any one of a plurality of said different sample classes.

11. A method according to claim 1 including determining a plurality of pixel values each from samples in a different respective sample class according to a rendering of volumetric data within the respective sample class, wherein one of said plurality of pixel values is selected by said selecting.

12. A method according to claim 1 in which each said class is defined according to a property of the uptake curve or kinetics associated with the value of a sample.

13. A method according to claim 1 wherein each said class is defined according to a rate of change of the value of a sample during said time sequence.

14. A method according to claim 12 or 13 in which a class is distinguished from any other class according to any one of: a said rate of change displaying persistently negative value within said time sequence; a said rate of change displaying a persistently substantially negligible or zero value within said time sequence; a said rate of change displaying persistently positive value during substantially all of said time sequence.

15. A method according to claim 1 including assigning in a given voxel class a null voxel value to the positions of voxels not classified in that class, the null voxel value being representative of the absence of a volumetric data for that voxel position in that class.

16. A method according to claim 1 including assigning to sample values in each sample class a colour different from the colour assigned to sample values in another sample class, such that said pixel values associated with one sample class are coloured differently to said pixel values associated with another sample class.

17. A method according to claim 1 including initially acquiring said time sequence of volumetric data sets.

18. A method according to claim 1 including constructing said two-dimensional image subsequent to generating said data therefore as a volume rendering of said volumetric data.

19. A method according to claim 1 in which said volumetric data sets represent a subject imaged according to a magnetic resonance imaging (MRI) procedure.

20. Apparatus for generating data for use in constructing a two-dimensional image rendered from a time sequence of volumetric data sets each representing a subject in three spatial dimensions at one of a succession of times within the time sequence, the method including:
   classifying means for classifying sample of the volumetric data into one of a plurality of sample classes according to changes in the value of the respective sample within the time sequence;
   determining means for determining pixel values from samples in different respective sample classes according to a rendering of volumetric data within the respective sample class;
   selecting means for selecting from amongst said pixel values one pixel value for use in constructing said two-dimensional image.

21. Apparatus according to claim 20 in which said determining means is operable to determine each of said pixel values from samples in a respective one of each of said plurality of sample classes.

22. Apparatus according to claim 20 in which said determining means is operable to:
(a) determine a pixel value from sample in a sample class according to a rendering of volumetric data within the sample class;
(b) repeat step (a) one or more times to determine each time another pixel value from sample in a different sample class according to a rendering of volumetric data within the different sample class.

23. Apparatus according to claim 20 including comparing means for comparing a pixel value with a comparison value, in which said selecting means is arranged to select a pixel value for use in constructing said two-dimensional image if said pixel value exceeds said comparison value, otherwise to select a different pixel value therefor.

24. Apparatus according to claim 20 in which the determining means is arranged such that the pixel values determined thereby correspond to the same image element position in said two-dimensional image according to each respective said rendering of volumetric data.

25. Apparatus according to claim 20 in which the identifying means is arranged such that each respective said rendering of volumetric data is a volume rendering employing the same direction of view through the volumetric data.

26. Apparatus according to claim 23 in which said comparison value is the pixel value of a said another pixel value.

27. Apparatus according to claim 23 in which said comparison value is a predetermined threshold value.

28. Apparatus according to claim 20 in which said determining means is arranged to perform each respective said rendering of volumetric data as a volume rendering using a Maximum Intensity Projection (MIP) methodology employing a line of view passing through the volumetric data at a position along which a pixel value is determined.

29. Apparatus according to claim 20 wherein said determining means is arranged to determine said another pixel value from sample in any one of a plurality of said different sample classes.

30. Apparatus according to claim 20 in which said determining means is arranged to determine a plurality of pixel values each from sample in a different sample class according to a rendering of volumetric data within the respective sample class, wherein said selecting means is arranged to select one of said plurality of pixel values.

31. Apparatus according to claim 20 in which said classifying means is arranged to define each said class according to the property of an uptake curve or kinetics associated with the value of a sample.

32. Apparatus according to claim 20 wherein said classifying means is arranged to define each said class according to a rate of change of the value of a sample during said time sequence.

33. Apparatus according to claim 31 or 32 in which said classifying means is arranged to distinguish a class from any other class according to any one of: a said rate of change displaying persistently negative value within said time sequence; a said rate of change displaying a persistently substantially negligible or zero value within said time sequence; a said rate of change displaying persistently positive value during substantially all of said time sequence.

34. Apparatus according to claim 20 in which the classifying means is arranged to assign in a given voxel class a null voxel value to the positions of voxels not classified in that class, the null voxel value being representative of the absence of a volumetric data in that class for that position.

35. Apparatus according to claim 20 in which the classifying means is arranged to assign to sample values in each sample class a colour different from the colour assigned to sample values in another sample class, such that said pixel values associated with one sample class are coloured differently to said pixel values associated with another sample class.

36. Apparatus according to claim 20 including image data acquisition means arranged to initially acquire said time sequence of volumetric data sets.

37. Apparatus according to claim 20 including image construction means arranged to construct said two-dimensional image subsequent to generation of said data therefore as a volume rendering of said volumetric data.

38. Apparatus according to claim 20 in which said volumetric data sets represent a subject imaged according to a magnetic resonance imaging (MRI) procedure.

39. A method according to claim 1 including selecting pixel values for one, some or all pixel positions within said two-dimensional image.

40. A method according to claim 39 including constructing a two-dimensional rendering using said one, some or all selected pixel values.

41. A method according to claim 39 or 40 including generating data for a plurality of different two-dimensional renderings of a given image subject each rendering being associated with a different viewing position.

42. A method according to claim 41 including constructing each of said plurality of different two-dimensional renderings.

43. A computer program product comprising a non-transitory computer readable medium encoded with a computer program for use in a computer, the program when executed performs the method of claim 1.

44. A computer programmed to execute a computer program according to the method of claim 1.

45. Apparatus according to claim 20 in which said selecting means is arranged to select pixel values for one, some or all pixel positions within said two-dimensional image.

46. Apparatus according to claim 45 including image construction means arranged to construct said two-dimensional rendering using said one, some or all selected pixel values.

47. A method according to claim 45 or 46 including means arranged to generate data for a plurality of different two-dimensional renderings of a given image subject each rendering being associated with a different viewing position.

48. A method according to claim 47 including image construction means arranged to construct each of said plurality of different two-dimensional renderings.

* * * * *